No. 651,573. Patented June 12, 1900.
F. W. LANCHESTER.
POWER PROPELLED VEHICLE.
(Application filed Sept. 6, 1899.)

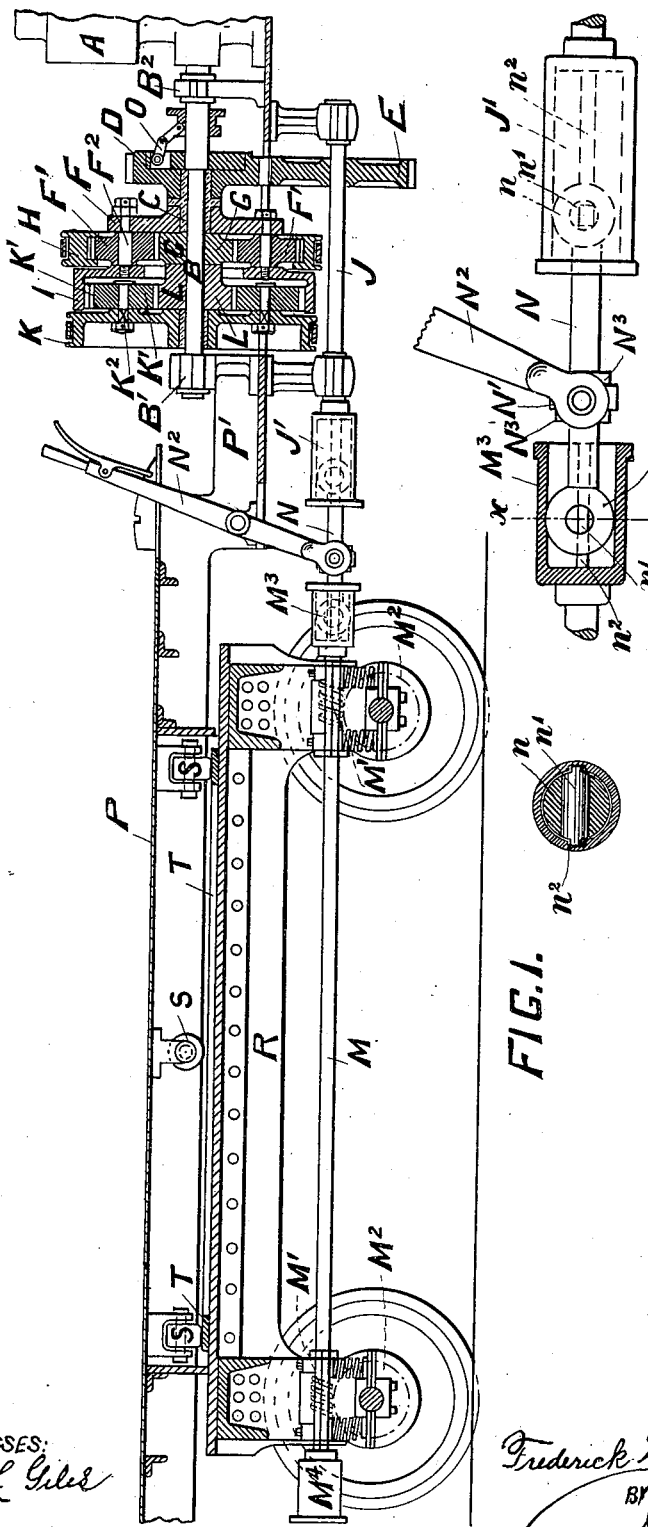

(No Model.) 3 Sheets—Sheet 2.

Attest:
 Walter Donaldson
 C. S. Middleton

Inventor
 Frederick W. Lanchester
 by Richards & Co.
 Attys

THE NORRIS PETERS CO., PHOTO-LITHO., WASHINGTON, D. C.

No. 651,573. Patented June 12, 1900.

F. W. LANCHESTER.
POWER PROPELLED VEHICLE.
(Application filed Sept. 6, 1899.)

(No Model.)  3 Sheets—Sheet 3.

UNITED STATES PATENT OFFICE.

FREDERICK WILLIAM LANCHESTER, OF BIRMINGHAM, ENGLAND.

POWER-PROPELLED VEHICLE.

SPECIFICATION forming part of Letters Patent No. 651,573, dated June 12, 1900.

Application filed September 6, 1899. Serial No. 729,648. (No model.)

*To all whom it may concern:*

Be it known that I, FREDERICK WILLIAM LANCHESTER, a subject of the Queen of Great Britain and Ireland, residing at Ladywood road, Edgbaston, in the city of Birmingham, England, have invented certain new and useful Improvements in Power-Propelled Vehicles, (for which I have filed an application for patent in Great Britain, No. 12,243, dated June 12, 1899,) of which the following is a specification.

My invention relates to improvements in power-propelled vehicles, and in part more particularly to light vehicles designed to run on rails.

The objects of my invention are, first, to provide a neat and compact form of gearing whereby two forward speeds and one reverse speed may be obtained, applicable to any ordinary type of motor-vehicle, and, secondly, to provide means whereby the body of a motor-propelled tram or other light vehicle may be arranged to swivel about a central vertical axis, carrying with it the motor, gearing, and controlling mechanism in order that its running direction may be reversed at a terminus or otherwise in an expeditious manner.

The method of carrying my invention into effect is illustrated in the accompanying sheet of drawings, in which—

Figure 4:
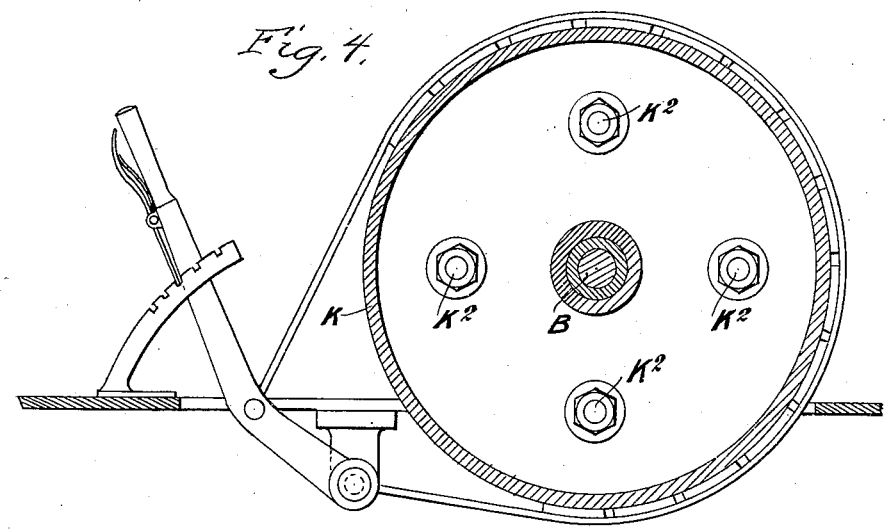
Figure 6:
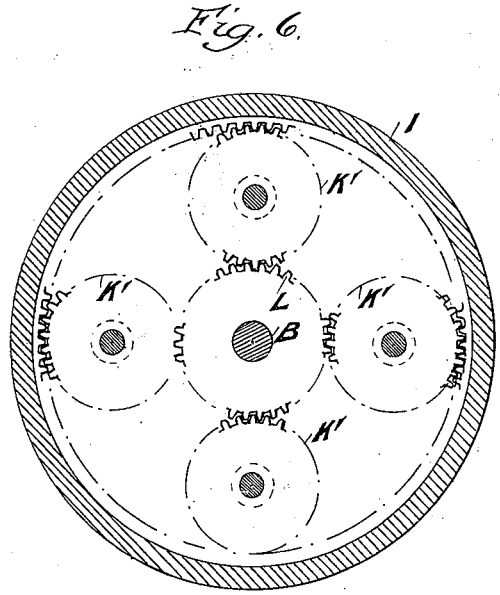
Figure 5:
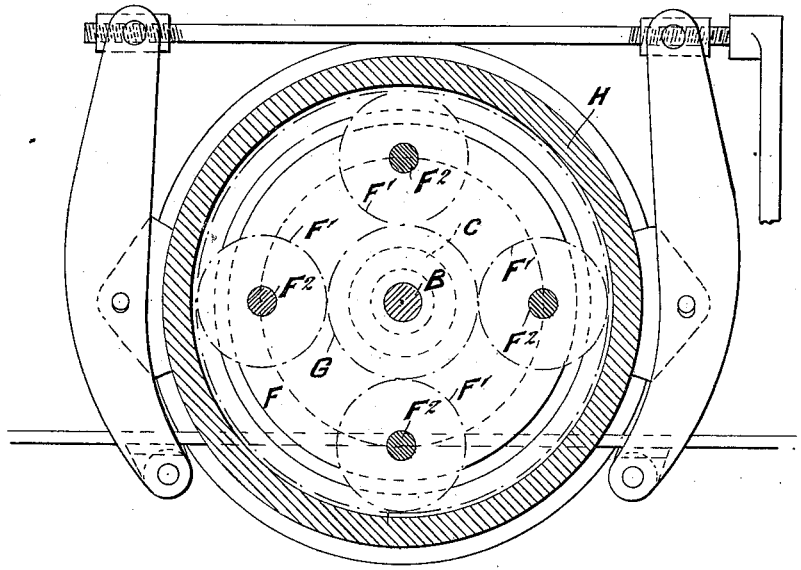

Figure 1 represents in section the wheel-frame and floor of a vehicle carrying the variable-speed and reversing gear. Fig. 2 is a detail view of the flexible coupling connecting the power-transmission shafting from the motor to the wheel-axles. Fig. 3 is a section on the line $x\ y$ of Fig. 2. Fig. 4 is a section through brake-drum K. Fig. 5 is a section through brake-drum H, and Fig. 6 is a section through drum I.

The motor A, which may be an oil-motor or other well-known type, is arranged on the driver's platform, with its crank-shaft placed longitudinally. This shaft is provided with an extension B, supported in suitable bearings B' and B². This extension carries a loose sleeve C, adapted to revolve on or with the shaft B. The sleeve is provided at one end with a gear-wheel D, which transmits motion from the motor-shaft to the car-axles through the gear-wheel E and transmission-shafting hereinafter described. The other end of the sleeve C carries a disk or arms F, upon which are mounted two or other convenient number of pinions F', forming the intermediate element of an epicyclic train, the inner or central element of which consists of the pinion G, fast upon the shaft B, the outer element consisting of the internally-toothed brake-drum H. The axles F² of the pinions F' carry at their outer ends an internally-toothed annulus I, which forms the outer element of a second epicyclic train, of which the intermediate element consists of two or other convenient number of pinions K', carried on axles K², fixed to the brake-drum K, which is loose upon the shaft B. The inner or central element of this second train consists of a pinion L, fast upon the shaft B. A clutch O is also provided, by means of which the gear-wheel D may be made fast to the shaft B. Brakes of any well-known form are arranged to be applied to the brake-drums H and K and suitable operating-levers and mechanism arranged to bring these brakes under the direct control of the driver. When the clutch O is in gear, the wheel D is fast to the shaft B, and consequently it revolves at the same speed and in the same direction as the motor-shaft. By tightening the brake-strap on the drum H, the clutch O being out of gear, the pinions F', driven by the pinion G, are caused to travel around the inside of the brake-drum, thus driving the disk F, and consequently the wheel D, in the same direction as but at a slower speed than the motor-shaft. When the strap on the brake-drum K is tightened, the pinions K', driven by the pinion L, cause the internally-toothed annulus I, and consequently the gear-wheel D, to travel in the reversed direction to the motor-shaft and at a slower speed. The above-described arrangement of epicyclic and clutch gear thus provides means whereby two speeds in the forward and one in the reversed direction may be given to the vehicle.

The motor and gearing hereinbefore described are supported on the driver's platform P', which forms an extension of the floor P of the vehicle. The vehicle is of the swivel type of horse tram-car in common use, in which a subframe or bogie R carries the car-body, which is provided with rollers S, attached to the floor P, so that it may swivel about a vertical axis on the turn-table T. Suitable arrangements are provided for locking the car-body to the frame R. Power is applied to the wheel-axles through worm-wheels $M^2$, driven by worms $M'$ on the shaft M, which passes from end to end of the bogie R. The axle-boxes are fitted with springs in the usual manner. The shaft M is provided at its ends with slotted hollow cylinders $M^3$ and $M^4$, each adapted to form one of the elements of a jointed coupling. A similar cylinder $J'$, but of greater length, is provided on the rearward end of the counter-shaft J. This counter-shaft, which carries the gear-wheel E, meshing with the wheel D, above mentioned, is arranged parallel to the motor-shaft beneath the driver's platform $P'$. The shafts J and M are flexibly connected by the coupling rod or shaft N. (Shown on a larger scale in Fig. 2.) This rod is provided at its ends with spherical enlargements $n$, which are drilled transversely to receive pins $n'$, the ends of which are planed down so as to fit the slots $n^2$ of the cylinders and slide freely therein. The coupling thus provided between shafts M and J affords the flexibility of transmission necessary on account of the motion of the car-body on its supporting-springs. A hand-lever $N^2$ is provided, connected to the shaft N in any suitable manner, so that a longitudinal movement under control of the driver may be given to said shaft. The connection shown consists of a U-slotted disk $N'$, engaging between shoulders $N^3$, and supported on pivots in the forked end of the hand-lever $N^2$. It will thus be seen that the power-transmission takes place from the motor-shaft either direct through the clutch M or through one of the epicyclic gear-trains to the gear-wheel D, thence to the lower wheel E, and thence through the coupling rod or shaft N to the worm-shaft M, the driving being effected by both pairs of wheels.

When it is desired to turn the car-body around—at a terminus, for example—the driver slides the coupling rod or shaft N forward, so that one end of it comes out of the cylinder $M^3$, the other end entering farther into the cylinder $J'$, thus disconnecting the shaft J from the shaft M. The locking-bolt of the car-body is then removed and the car-body is turned around on its rollers end to end and the driver slides the coupling-shaft N into place, with its end in the cylinder $M^4$.

Having now described my invention, what I claim as new, and desire to secure by Letters Patent, is—

1. In power-propelled vehicles, a variable-speed and reversing gear, comprising in combination, clutch mechanism, a gear-wheel, whence motion is conveyed to the wheel-axles through transmission-gear, said gear-wheel being connected to a disk or arms supporting the intermediate element of an epicyclic train consisting of a pinion or pinions meshing with an outer internally-toothed brake-annulus, and with a central pinion fast on the driving-shaft, the axles of said intermediate element, also carrying an internally-toothed annulus forming the outer element of a second epicyclic train whose central pinion is fast on the driving-shaft and whose intermediate element consists of a pinion or pinions mounted on an axle or axles carried by a brake-drum loose on the driving-shaft, the brake-annulus and brake-drum before mentioned being provided with brakes whereby one or other may be held stationary and the gear-train pertaining thereto, rendered operative.

2. In power-propelled vehicles of the swivel type power-transmission gear comprising in combination, a shaft J, and motor for driving the same carried by the car-body, and provided with a universal joint or element thereof such as $J'$, a shaft M carried by the bogie-frame of the car and provided at its ends with universal joints or elements thereof, such as $M^3$ and $M^4$, a coupling-rod N whereby the shaft J, may be coupled to either end of the shaft M, with means whereby longitudinal movement may be given to the coupling-rod.

In witness whereof I have hereunto set my hand in presence of two witnesses.

FREDERICK WILLIAM LANCHESTER.

Witnesses:
ALBERT G. PARKER,
F. J. BIGNELL.